(12) United States Patent
Gauthier et al.

(10) Patent No.: US 6,934,652 B2
(45) Date of Patent: Aug. 23, 2005

(54) ON-CHIP TEMPERATURE MEASUREMENT TECHNIQUE

(75) Inventors: Claude R. Gauthier, Cupertino, CA (US); Gin S. Yee, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/704,843

(22) Filed: Nov. 10, 2003

(65) Prior Publication Data

US 2005/0114061 A1    May 26, 2005

(51) Int. Cl.[7] ............................................. G01K 15/00
(52) U.S. Cl. ........................ 702/99; 702/130; 702/132; 377/19; 377/25
(58) Field of Search ....................... 702/99, 130, 132; 377/19, 25

(56) References Cited

U.S. PATENT DOCUMENTS

| | | | |
|---|---|---|---|
| 5,499,214 A | * | 3/1996 | Mori et al. .................. 365/222 |
| 5,638,418 A | * | 6/1997 | Douglass et al. ............. 377/25 |
| 6,115,441 A | * | 9/2000 | Douglass et al. ............. 377/25 |
| 6,476,632 B1 | | 11/2002 | La Rosa et al. ............. 324/769 |
| 2003/0155903 A1 | | 8/2003 | Gauthier et al. ......... 324/76.41 |

* cited by examiner

Primary Examiner—John Barlow
Assistant Examiner—Anthony T. Dougherty
(74) Attorney, Agent, or Firm—Hamilton & Terrile, LLP; Gary W. Hamilton

(57) ABSTRACT

A temperature monitoring technique that eliminates the need for bipolar devices. In one embodiment of the present invention, a long-channel MOS transistor is configured in a diode connection to sense change in temperature. The diode drives a linear regulator and an oscillator. The oscillator in turn drives a counter, which counts pulses for a fixed period of time. The system clock on the chip is used as a temperature-independent frequency to generate a count. The temperature-dependent frequency is counted for a fixed number of system clock cycles. The present invention eliminates band gap circuitry currently used in most thermal sensing devices to provide a temperature-independent reference.

20 Claims, 5 Drawing Sheets

ON-CHIP TEMPERATURE MEASUREMENT TECHNIQUE

TECHNICAL FIELD OF THE INVENTION

The present invention generally relates to integrated circuits, and more particularly, to a system and method to monitor the temperature of integrated circuits.

BACKGROUND OF THE INVENTION

As techniques for fabricating integrated circuits have advanced, the number of circuit components in integrated circuits has increased dramatically. It is well known that the increase in the number of circuit components placed on integrated circuits has led to an increase in temperature generated by such circuits.

Temperature gradients across the dies of conventional high performance very large scale integration (VLSI) components, such as a microprocessor, can adversely affect component performance. For example, a temperature variation between two clock driver circuits within a microprocessor often results in a skew in the system clock of the microprocessor. Moreover, the die of the microprocessor may reach an unacceptable temperature that causes the microprocessor to malfunction or stop functioning.

Many of the currently used sensing devices for monitoring temperature are based on bipolar devices. The base-emitter voltage of bipolar devices, however, does not scale in the same manner as the threshold of metal oxide semiconductor transistors used in many current integrated circuits. For example, many current CMOS devices operate with power supply voltage levels of less than 1 Volt and devices will operate with even lower voltages in the near future. Eventually, the supply voltages of these devices will be lower than the 0.4–0.5 Volt required to provide a forward bias for a conventional diode. Nonetheless, most prior art solutions for monitoring temperature involve bipolar devices because the base emitter voltage is typically more controlled.

In view of the shortcomings of the prior art, there is a need for a technique for monitoring temperatures in integrated circuits without the need for bipolar devices. Such a technique is provided by the method and apparatus of the present invention as described below.

SUMMARY OF THE INVENTION

The present invention provides a temperature monitoring solution that eliminates the need for bipolar devices. In the present invention, a temperature-dependent voltage is generated using a long-channel MOS transistor configured in a diode connection or a similar component. In one embodiment of the invention, the diode drives a linear regulator which provides an input to a voltage-controlled ring oscillator. In alternate embodiments of the invention, the diode is connected directly to the ring oscillator.

In each of the aforementioned embodiments, the output of the ring oscillator provides a temperature-dependent frequency. The system clock of the chip is used as a temperature-independent frequency to generate a reference count. The temperature-dependent frequency is counted for a fixed number of system clock cycles determined by the reference count. The temperature-dependent count is then correlated with information stored in a calibration reference.

Upon initial calibration of the sensor, information relating to a known temperature is stored in the calibration reference using permanent memory, such as an irreversibly programmable memory (e.g., an e-fuse), or a semi-permanent memory, such as an EEPROM. To find the temperature of a die in an operating environment, the count corresponding to the temperature-dependent frequency is compared to the information stored in the calibration reference using a comparator. In the system of the present invention, the temperature can be determined by interpolating between two known reference points in the data contained in the calibration reference.

The method and apparatus of the present invention represents an improvement over the prior art because it relies on a fixed system clock instead of a complex analog circuit. In addition, the present invention eliminates band gap circuitry currently used in most thermal sensing devices to provide a temperature-independent reference. The present invention offers numerous advantages over the prior art, including reduced area, reduced risk, and greater accuracy, as will be understood by those of skill in the art.

BRIEF DESCRIPTION OF THE DRAWINGS

An illustrative embodiment of the present invention will be described below relative to the following drawings.

DETAILED DESCRIPTION

The illustrative embodiment of the present invention provides a temperature monitoring system for an integrated circuit that provides one or more die temperature measurements of the integrated circuit to actively monitor and control the die temperature across the integrated circuit. In the illustrative embodiment, the temperature monitoring system includes at least one thermal sensor that is configured as an active device to sense a die temperature of an integrated circuit and a controller to determine if the temperature sensed by the active thermal sensor indicates an undesirable temperature condition in the integrated circuit.

In the illustrative embodiment, the temperature monitoring system is attractive for use in integrated circuits that require highly accurate and reliable die temperature measurements. Each thermal sensor in the system operates in an independent manner, that is, without disturbing other operations being concurrently performed in the integrated circuit. Consequently, each thermal sensor is able to accurately sense and report a temperature value regardless of any change in system clock frequency of the integrated circuit.

Each thermal sensor independently reports a die temperature measurement to a system controller so that a comprehensive temperature measurement of an integrated circuit can be obtained to avert an undesirable temperature condition. The temperature monitoring system of the illustrative embodiment also provides an independent calibration thermal sensor.

The illustrative embodiment of the present invention allows for an active thermal sensor to be embedded in multiple die locations across the die of an integrated circuit, such as a microprocessor, to permit thermal profiling of the microprocessor as it executes various functions. The active thermal sensor operates without hindering or interfering with the operation of the microprocessor as it processes data and instructions. In this manner, the active thermal sensor operates independently of the microprocessor to provide a highly accurate temperature measurement as the microprocessor processes data and instructions irrespective of the clock frequency at which the microprocessor is operating.

Figure 1:
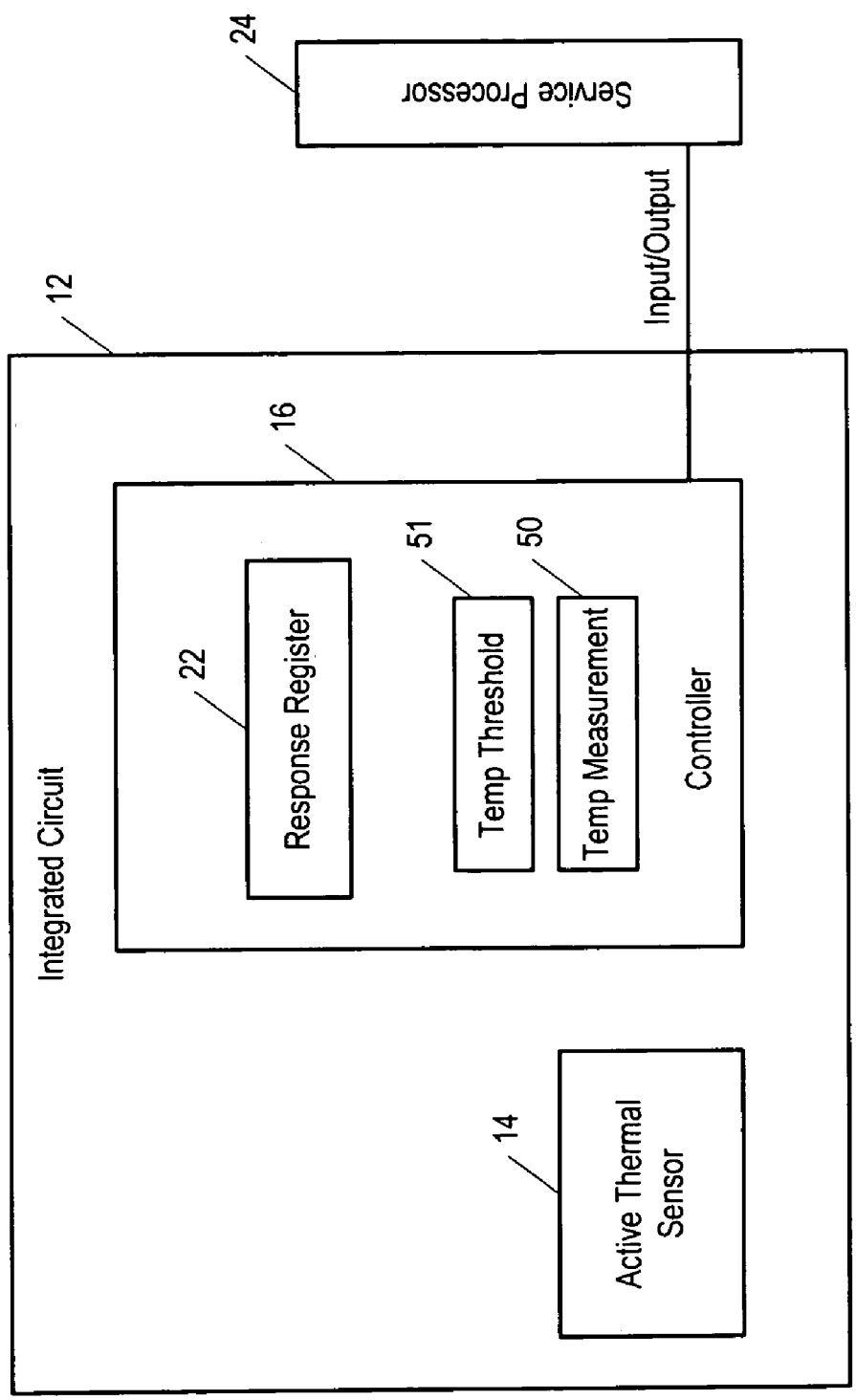
FIG. 1 depicts a block diagram of an exemplary integrated circuit having an active thermal sensor and a controller that are suitable for practicing the illustrative embodiment of the present invention.

FIG. 1 is a block diagram of an exemplary integrated circuit 12 that is suitable for practicing the illustrative embodiment of the present invention. The exemplary integrated circuit 12 is adapted to include an active thermal sensor 14 coupled to a controller 16. The active thermal sensor 14 senses a die temperature of the exemplary integrated circuit 12 and reports a value, which is typically digital, to the controller 16 that represents the sensed die temperature at the location of the active thermal sensor 14. The controller 16 receives the sensed temperature value from the active thermal sensor 14 in serial fashion. The controller 16 monitors the sensed temperature value for an unacceptable temperature indication. The controller 16 is adapted to include one or more input and output ports that are coupled to a service processor 24, a response register 22, one or more temperature measurement registers 50, and one or more temperature threshold registers 51.

The service processor 24 provides the controller 16 with a multitude of information, such as calibrated temperature threshold values for use by the controller 16 to determine if the value reported by the active thermal sensor 14 indicates an undesirable temperature condition or event. Nevertheless, one skilled in the art will recognize that the calibrated temperature threshold values can be provided to the controller 16 in any suitable manner, for example upon power on or as part of a reset sequence or command. The controller 16 holds the calibrated temperature threshold values in the one or more temperature threshold registers 51. The controller 16 is adapted to include one temperature threshold register 51 for each active thermal sensor 14 embedded in exemplary integrated circuit 14, although in some applications a single temperature threshold register 51 for use with multiple active thermal sensors 14 may be sufficient. Typically, the calibrated temperature threshold values are empirically derived from tests or measurements of the service processor 24 during manufacturing. The service processor 24, also provides the controller 16 with information concerning the number of over-temperature indications that need to be detected and reported by the active thermal sensor 14 before a response is necessary. In addition, the service processor 24 loads the response register 22 with the particular type of response the controller 16 should execute if the over-temperature indication is determined to be outside an acceptable limit. The response register 22 is discussed below in more detail relative to FIG. 2. Those skilled in the art will recognize that the service processor 24 can be configured to support the application, for example, a service processor, a microprocessor and the like. Nevertheless, those skilled in the art will appreciate that the service processor 24 can be a device not integrated into the exemplary integrated circuit 12 so that the service processor 24 is "off-chip."

The temperature measurement register 50 is a storage element that stores the response from the active thermal sensor 14 for the controller 16. The controller 16 typically shifts the content of the temperature measurement register 50 to the service processor 24 when polled by the service processor 24. Those skilled in the art will recognize that the response from the active thermal sensor 14 can be processed or manipulated before being stored in a temperature measurement register. For example, a number of bits may be stripped off to reduce the size of the register without impacting measurement accuracy.

The active thermal sensor 14 is configured so that measurement accuracy is not impacted by a change in the system clock frequency utilized by other circuits and devices within the exemplary integrated circuit 12. The active thermal sensor 14 can be placed in multiple locations across the die of the exemplary integrated circuit 12. Consequently, more than one active thermal sensor 14 can be embedded in the die of the exemplary integrated circuit 12. As such, one active thermal sensor 14 can be embedded at a die location that is expected to have the greatest amount of thermal dissipation while a second active thermal sensor 14 can be embedded at a die location that is expected to have the least amount of thermal dissipation. In this manner a highly accurate thermal profile of an integrated circuit can be measured and monitored.

The active thermal sensor 14 senses and reports a temperature value that represents either an absolute or relative die temperature at the sensor's location. The value reported by the active thermal sensor 14 is a digital value typically containing 11 bits with a measurement accuracy of ±1.5° C. Those skilled in the art will recognize that the active thermal sensor 14 can be adapted to report a data unit with more than eleven bits of data or less than eleven bits of data without departing from the scope of the illustrative embodiment of the present invention. Moreover, those skilled in the art will recognize that the active thermal sensor 14 can be adapted to report an analog value that can be digitized.

In operation, the controller 16 interfaces with the service processor 24 to determine if a temperature condition or event exists, such as an over-temperature event or an under temperature event. The controller 16 is able to react to a temperature condition or event before a loss of functionality in the exemplary integrated circuit 12 occurs due to an unacceptable thermal condition. Typically, the controller 16 utilizes a variable measurement window of temperature measurements to determine whether a temperature condition or event exists at a die location within the exemplary integrated circuit 12. The controller 16 performs a comparison of a current response from an active thermal sensor 14 with a unique temperature threshold value associated with the reporting active thermal sensor 14. The unique temperature threshold value for the particular active thermal sensor 14 is provided to the controller 16 by the service processor 24 and held in the temperature threshold register 51. Moreover, those skilled in the art will appreciate that the controller 16 can be adapted to store one or more temperature threshold values permanently, for example with fuses.

The controller 16 utilizes the measurement window provided by the service processor 24 to filter out erroneous temperature measurements from the active thermal sensor 14. The measurement window provided by the service processor 24 indicates to the controller 16 the number of responses from the active thermal sensor 14 that need to exceed the established threshold value for that particular active thermal sensor before the controller 16 seeks to execute a response to prevent the exemplary integrated circuit 12 from malfunctioning. The number of responses or the size of the measurement window can be determined through various statistical techniques, such as standard deviation and the like, through trial and error or through any other suitable technique to filter or remove an erroneous fault indicator, such as a statistical outlier. Those skilled in the art will recognize that the measurement window can be adapted to provide the controller 16 with an upper control limit (UCL) and a lower control limit (LCL) to filter out responses that are either above the UCL or below the LCL. Moreover, the size of the measurement window or the number of responses relied upon to indicate a temperature event can be based on a number of consecutive responses or measurements, a number of responses or measurements that exceed the threshold value during a period of time or a number of samples for example, three out of the last five responses, or any other suitable technique to avoid executing an unnecessary response.

Figure 2:
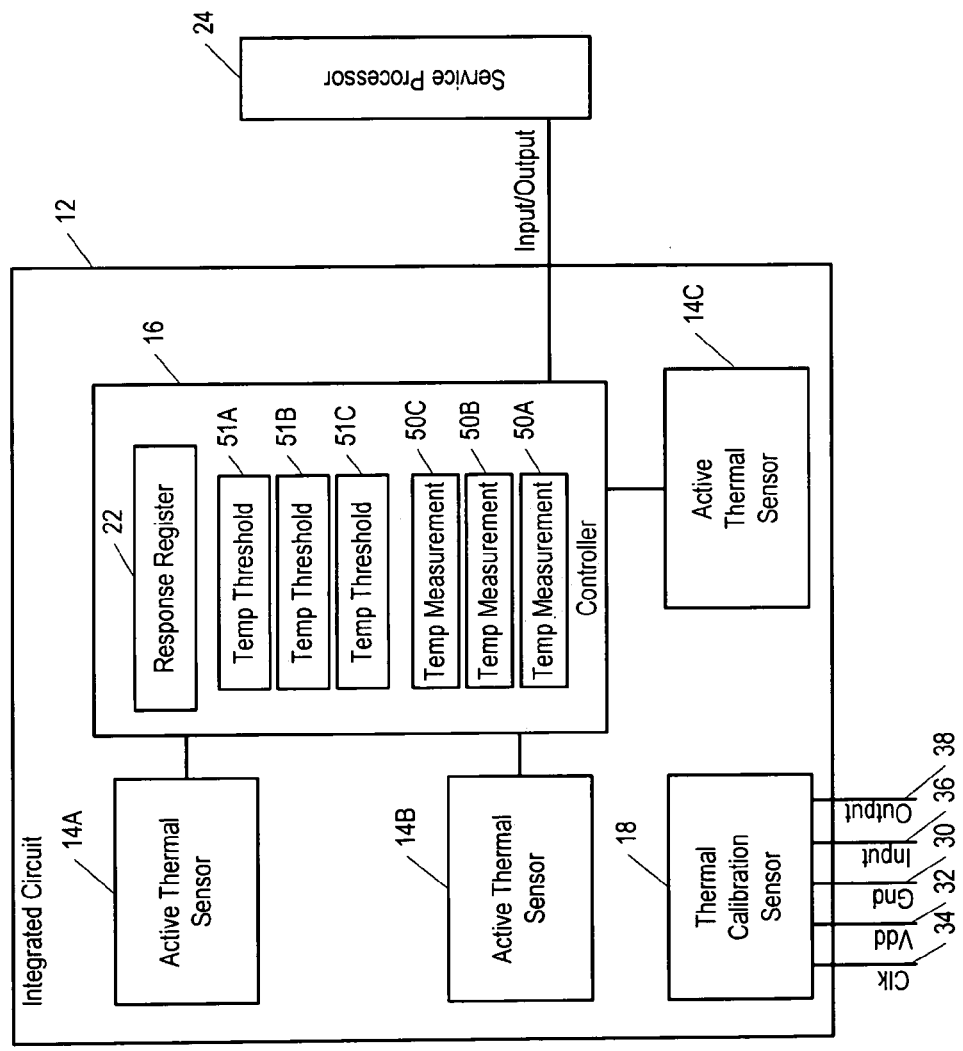
FIG. 2 illustrates a block diagram of an exemplary integrated circuit having more than one active thermal sensor, a calibration sensor and a controller for practicing an illustrative embodiment of the present invention.

FIG. 2 illustrates the exemplary integrated circuit 12 configured to include more than one active thermal sensor 14 coupled to the controller 16. As illustrated, active thermal sensors 14A, 14B and 14C are embedded at various die locations of the exemplary integrated circuit 12 to sense a physical stimulus at multiple discrete locations. Those skilled in the art will recognize that the active thermal sensors 14A, 14B and 14C are like active thermal sensors and operate in the same manner to sense and report a value that indicates an absolute or relative die temperature at each sensor's location. In this manner, thermal profiling of the exemplary integrated circuit 12 can be readily accomplished. The benefit of thermal profiling can be significant especially when the exemplary integrated circuit 12 is a microprocessor that executes various code streams.

The controller 16 stores each response from each of the active thermal sensors 14A, 14B and 14C in separate registers within the controller 16, for example, temperature measurement registers 50A, 50B and 50C. The controller 16 is able to send the content of each of the temperature measurement registers 50A, 50B and 50C directly to the service processor 24, for example, by polling or any other suitable technique for transferring data. Moreover, for each of the active thermal sensors 14A, 14B and 14C the service processor 24 provides a unique temperature threshold value that is suited to each sensor's location in the die of the exemplary integrated circuit 12. Each unique temperature threshold value is held in separate registers within the controller 16, for example, temperature threshold registers 51A, 51B and 51C. Those skilled in the art will appreciate that a common temperature threshold value can be used in place of a unique temperature threshold value for each active thermal sensor.

The exemplary integrated circuit 12 can also be configured to include a thermal calibration sensor 18. The thermal calibration sensor 18 is an active thermal sensor, similar to the active thermal sensor 14, that is able to sense a physical stimulus and report a response corresponding to an absolute or relative value of the physical stimulus. The thermal calibration sensor 18 senses a physical stimulus in the same manner and with the same measurement accuracy as the active thermal sensor 14. Nevertheless, the thermal calibration sensor 18 is independent of any active thermal sensor 14 embedded in the die of the exemplary integrated circuit 12.

The thermal calibration sensor 18 includes a clock-input node 34, a power input node 32, a ground node 30, an input node 36 and an output node 38. The input node 36 and the output node 38 provide the thermal calibration sensor 18 with an interface external to the exemplary integrated circuit 12. The power input node 32 is tied to a voltage source that can be controlled independently of any voltage source supplying a voltage signal to other active devices within the exemplary integrated circuit 12. The clock node 34 is also coupled to a clock source or driver that can be controlled independently of any other clock source or driver within the exemplary integrated circuit 12. In this manner, the thermal calibration sensor 18 can be operated independently of the exemplary integrated circuit 12. Thus, for calibration purposes, a baseline temperature of the thermal calibration sensor 18 can be measured or determined that is representative of the die temperature of the exemplary integrated circuit 12 in a non-clocked state. Thus, temperature threshold values for each active thermal sensor 14A, 14B, and 14C can be determined without having to compensate for the thermal effects of having one or more other active elements on or operating within the exemplary integrated circuit 12 during active baselining.

Optionally, the calibration sensor 18 and the active thermal sensor 14 can be implemented with like circuit configurations except for an interface portion of the calibration sensor 18. Typically, the calibration sensor 18 reports a sensed temperature value directly "off-chip," although each active thermal sensor 14 can also be adapted to report a sensed temperature value directly "off-chip." The use of like circuit configurations for the calibration sensor 18 and the active thermal sensor 14 allows for the development or measurement of one or more calibration temperature measurements that can be equally applied to each active thermal sensor 14 implemented. Furthermore, the use of like circuit configurations simplifies layout and manufacture of an integrated circuit embodying a temperature monitoring system illustratively described herein.

Figure 3A:
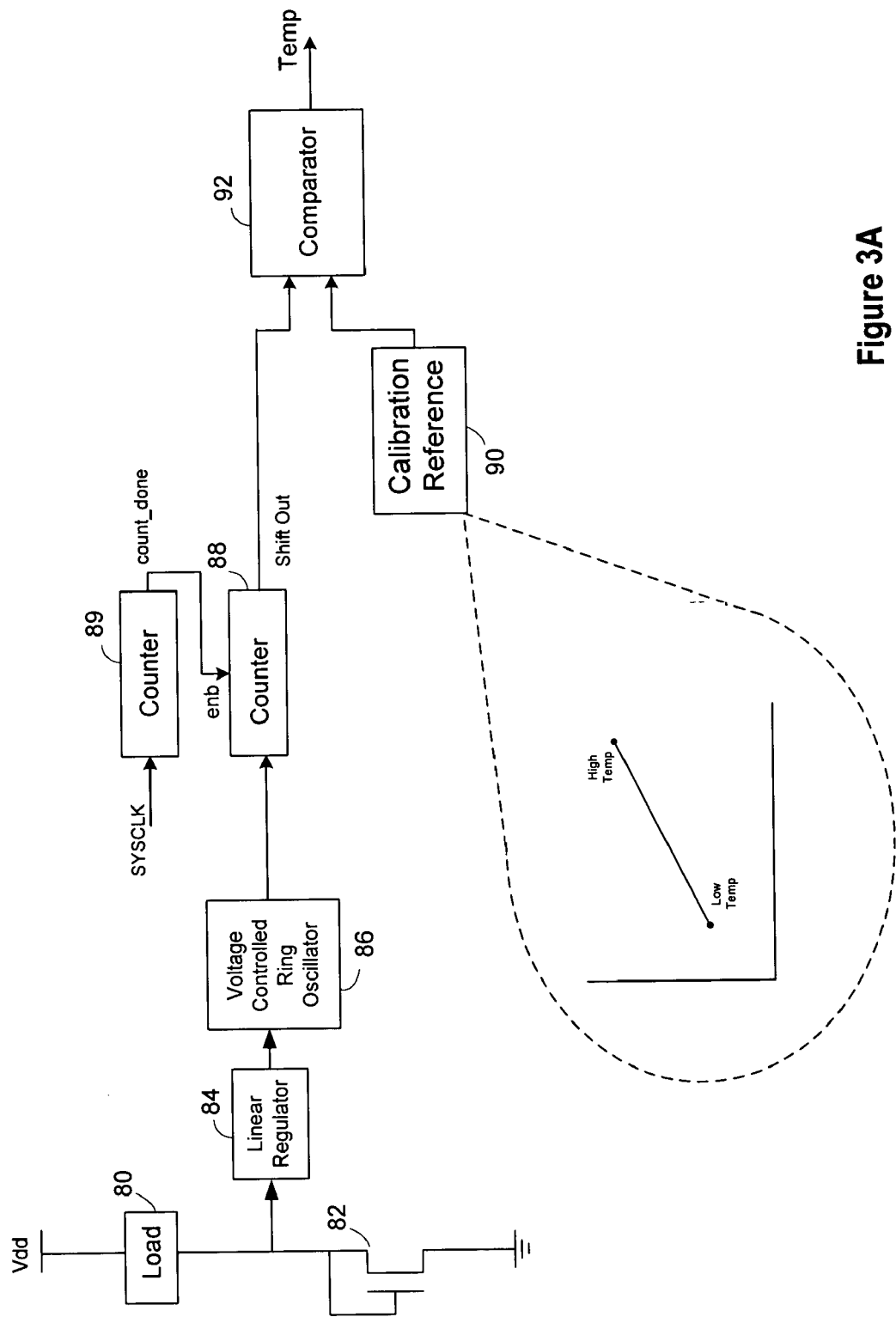
FIG. 3A is an illustration of circuit components for thermal measurement of a circuit using a MOS transistor to provide a temperature-dependent voltage and the system clock to generate a temperature-independent signal.
Figure 3B:
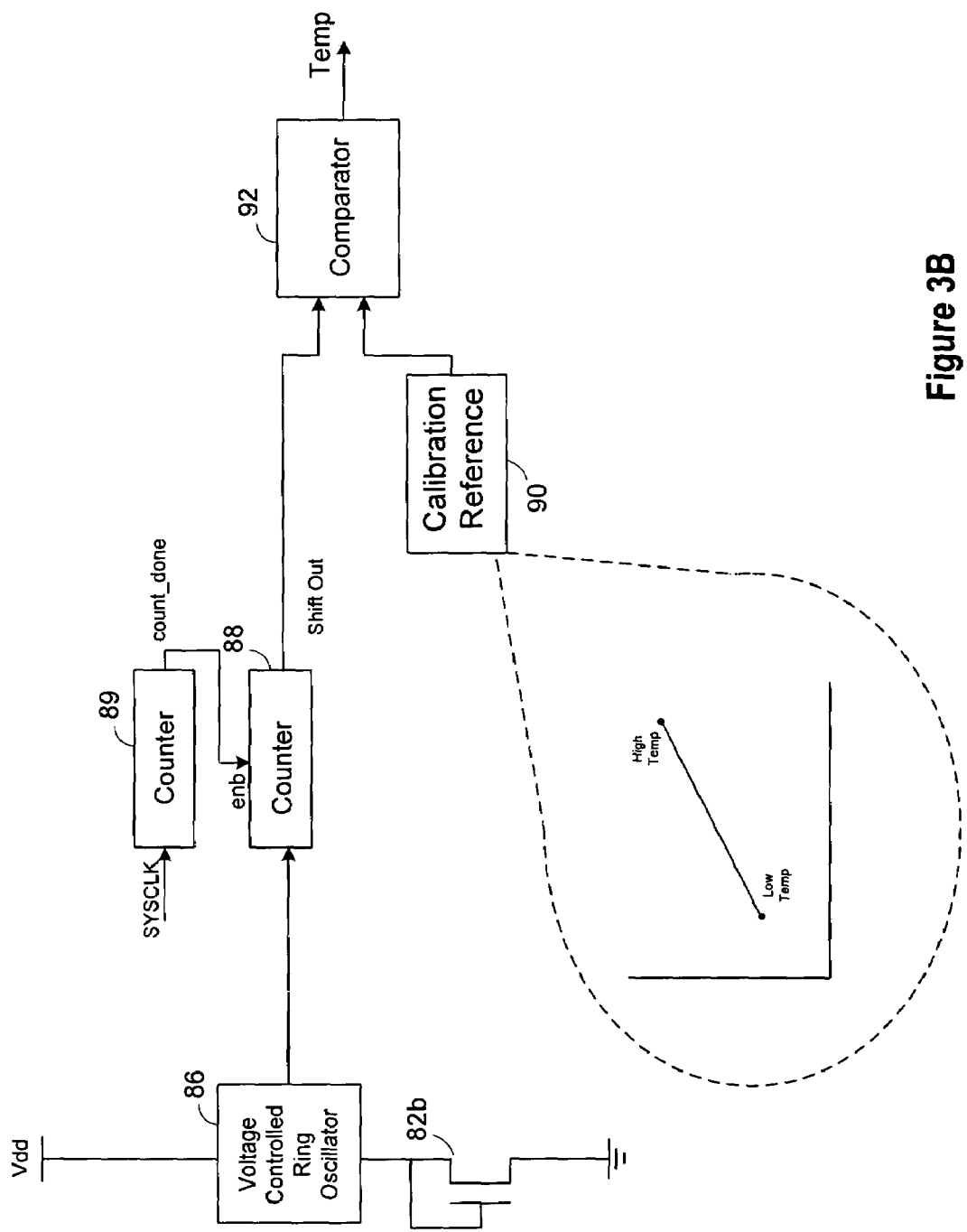
FIG. 3B is an illustration of an alternate embodiment of circuit components for thermal measurement of a circuit using a MOS transistor to provide a temperature-dependent voltage and the system clock to generate a temperature-independent signal.
Figure 3C:
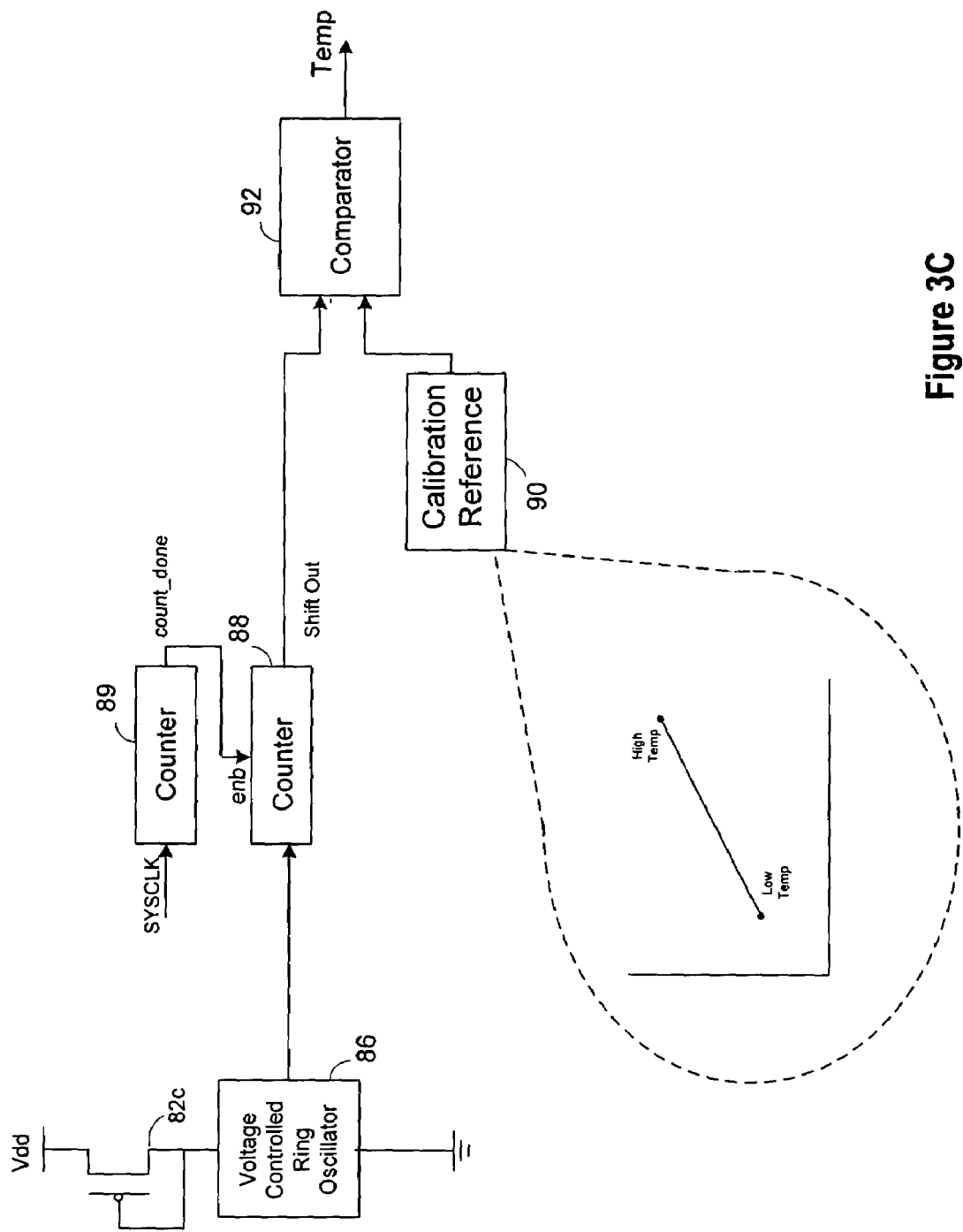
FIG. 3C is an illustration of another alternate embodiment of circuit components for thermal measurement of a circuit using a MOS transistor to provide a temperature-dependent voltage and the system clock to generate a temperature-independent signal.

FIG. 3A is an illustration of circuit components for thermal measurement of a circuit using a long channel MOS transistor to provide a temperature-dependent voltage and the system clock to generate a temperature-independent signal. A load 80 is connected to a long channel MOS transistor 82 connected in a diode configuration to sense change in temperature. The resulting temperature signal drives a linear regulator 84 which provides an input to a voltage-controlled ring oscillator 86 thereby generating a temperature-dependent frequency. The ring oscillator 86 in turn drives a counter 88 that counts pulses for a fixed period of time in response to "count start" and "count stop" signals. The system clock on the integrated circuit is also provided as an input to the counter 88 to provide a temperature-independent frequency. This configuration represents an improvement over the prior art because it relies on a fixed system clock instead of a complex analog circuit.

Upon initial calibration of the sensor, information relating to a known temperature is stored in the calibration reference 90. For example, the sensor 80 can be calibrated to a known temperature of 25 degrees Celsius by using the counter output to set the e-fuses in the calibration reference storage 90. The information in the calibration reference 90 can be stored using permanent memory, such as an irreversibly programmable memory (e.g., an e-fuse), or a semi-permanent memory, such as an EEPROM. To find the temperature of a die in an operating environment, the output of the counter 88 is compared to the information stored in the calibration reference 90 using the comparator 92.

In operation, the output frequency of the voltage-controlled ring oscillator will change in response to voltage changes detected by the temperature-dependent MOS transistors 82, 82A and 82B in the various embodiments described herein. As the output frequency of the voltage-controlled ring oscillator 86 changes, the frequency count shifted out of the counter 88 will change and, therefore, a different temperature will be calculated by the comparator 92 when comparing the frequency output to the information contained in the calibration reference 90.

The thermal measurement system described herein eliminates the need for bipolar devices. The present invention also eliminates band gap circuitry currently used in most thermal sensing devices to provide a temperature-independent reference. The temperature measurement system of the present invention offers reduced area, reduced risk, greater accuracy.

While the present invention has been described with reference to a preferred embodiment thereof, one skilled in the art would appreciate that changes in form and detail may be made without departing from the intended scope of the present invention as defined in the pending claims. For example, each active thermal sensor can be configured to assert a signal to indicate to the controller that a current die temperature value is available. Moreover, the functions provided by the microprocessor can be incorporated into the controller to further reduce the number of off chip interfaces. In addition, the active thermal sensors and the controller can communicate in either a uni-directional or bi-directional manner, and each active thermal sensor and the controller can be coupled to a scan chain to provide additional control and observation of the temperature sensing system. Further, the active thermal sensor can be adapted to include a point-to-point synchronous interface to the controller or adapted so that each active thermal sensor and the controller are all coupled to a serial communication link for efficient communication.

What is claimed is:

1. A system to monitor a temperature of an integrated circuit, comprising:
   a counter operable to receive first and second inputs corresponding to temperature measurements of said integrated circuit and for generating output count signals representative thereof;
   a temperature-dependent sensor for generating said first input for said counter corresponding to a temperature measurement on said integrated circuit;
   a temperature-independent reference source for generating said second input for said counter corresponding to a system clock of said integrated circuit; and
   a comparator for comparing said output of said counter to a known calibration reference to generate a temperature measurement signal.

2. The system of claim 1, wherein said known calibration reference is stored in a calibration reference comprising e-fuses set to a predetermined value.

3. The system of claim 1, wherein said temperature-dependent sensor comprises a long-channel MOS transistor.

4. The system of claim 3, wherein said long-channel MOS transistor provides an input signal to a linear regulator.

5. The system of claim 4, further comprising a voltage-controlled ring oscillator operable to receive an output signal from said linear regulator and to generate said first input signal for said counter.

6. The system of claim 5, wherein said counter is operable to count pulses for a fixed period of time corresponding to count start and count stop input signals.

7. The system of claim 1, wherein the output of said comparator is provided to a controller comprising an interface for communication with a microprocessor to monitor the temperature of the integrated circuit.

8. The system of claim 7, wherein said temperature indicates a die temperature of said integrated circuit.

9. The system of claim 8, wherein said controller is coupled to a plurality of thermal sensors to interpret said value asserted by each of said plurality of thermal sensors to monitor and control said temperature of said integrated circuit.

10. The system of claim 9, wherein said integrated circuit includes a substrate and wherein said thermal sensor is built onto said substrate of said integrated circuit.

11. A method for monitoring temperature of an integrated circuit, said method comprising the steps of:
    generating a temperature-dependent signal at a first frequency using a temperature-dependent sensor;
    generating a temperature-independent signal at a second frequency using a temperature-independent source comprising a system clock of said integrated circuit;
    receiving said temperature-dependent signal and said temperature-independent signal as inputs to a counter and generating an output signal therefrom;
    comparing said counter output signal to a known reference; and
    comparing said output of said counter to a known calibration reference to generate a signal corresponding to the temperature of said integrated circuit.

12. The method of claim 11, wherein said known calibration reference is stored in a calibration reference comprising e-fuses set to a predetermined value.

13. The method of claim 11, wherein said temperature-dependent sensor comprises a long-channel MOS transistor.

14. The method of claim 13, wherein said long-channel MOS transistor provides an input signal to a linear regulator.

15. The method of claim 14, wherein said linear regulator generates an output signal that is received by a voltage-controlled ring oscillator operable to generate said temperature-dependent signal at said first frequency to provide an input to a counter.

16. The method of claim 15, wherein said counter is operable to count pulses for a fixed period of time corresponding to count start and count stop input signals.

17. The method of claim 11, wherein the output of said comparator is provided to a controller comprising an interface for communication with a microprocessor to monitor the temperature of the integrated circuit.

18. The method of claim 17, wherein said temperature indicates a die temperature of said integrated circuit.

19. The method of claim 18, wherein said controller is coupled to a plurality of thermal sensors to interpret said value asserted by each of said plurality of thermal sensors to monitor and control said temperature of said integrated circuit.

20. The method of claim 19, wherein said integrated circuit includes a substrate and wherein said thermal sensor is built onto said substrate of said integrated circuit.

* * * * *